G. E. JONES.
CHART FOR USE IN TEACHING THE ART OF READING.
APPLICATION FILED APR. 14, 1920.
1,392,014. Patented Sept. 27, 1921.
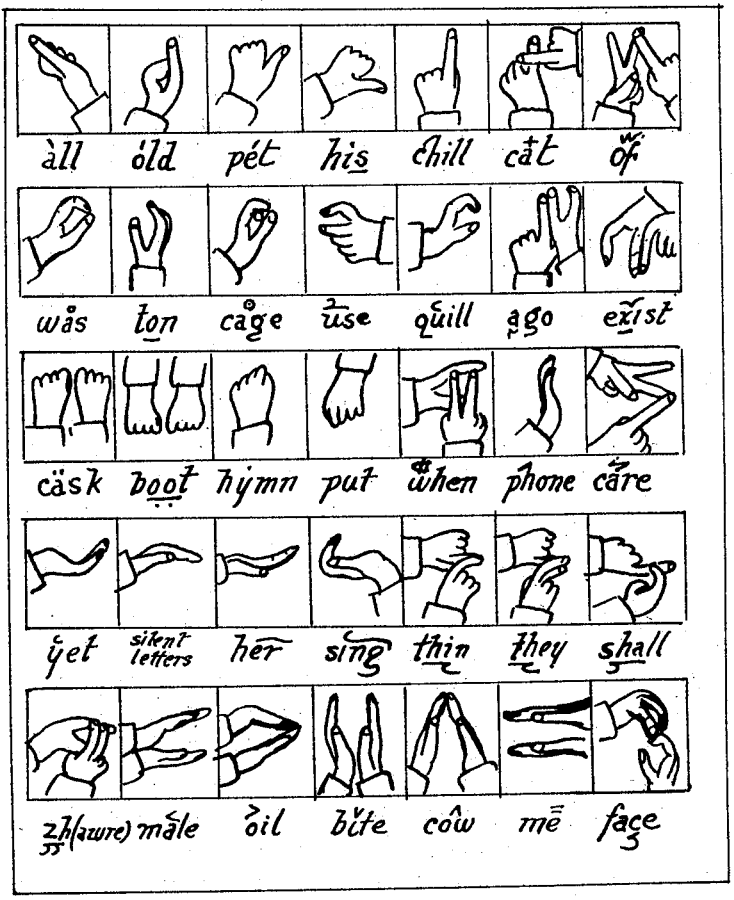

UNITED STATES PATENT OFFICE.

GEORGE EDWARD JONES, OF BUNDARRA, NEW SOUTH WALES, AUSTRALIA.

CHART FOR USE IN TEACHING THE ART OF READING.

1,392,014. Specification of Letters Patent. Patented Sept. 27, 1921.

Application filed April 14, 1920. Serial No. 373,863.

*To all whom it may concern:*

Be it known that I, GEORGE EDWARD JONES, a subject of the King of Great Britain and Ireland, residing at Bundarra, in the State of New South Wales, Commonwealth of Australia, have invented certain new and useful Improved Charts for Use in Teaching the Art of Reading, of which the following is a specification.

The purpose of this invention is to direct and assist the acquisition of the art of reading by representing to the learner the correct sound values of single letters or combinations of letters of the alphabet in the various words of the language by means of a fixed chart of sound value symbols capable of being illustrated by means of a related and explanatory system of manual and digital movements, each of which symbolizes one sound only, no matter what alphabetic characters are used to convey that sound. Thus the symbol "<" which is used to denote the sound of "a" in "male" is also used for such combinations of letters "ai," "ay," "ei," "ea," etc., when these symbolize the same sound as the "a" referred to. This principle applies throughout the system, whether vowel or consonantal characters be employed. The arms of the diacritic used may be lengthened to cover all the letters in a combination, but when on account of its form any of them cannot be conveniently lengthened, a tie or band is used in conjunction with the diacritic; thus "grow," "paw," "friend," also "boot" and "sing" as shown in the drawing. Some of my signs are, as shown on the chart, placed above, others below the letters governed by them.

To enable my system to be readily assimilated by the learner each of my symbols is represented by a hand play movement suggestive thereof, and in application the hand movements preferably synchronize with the vocalization, thus imparting to the pupil a true knowledge and perception of phonetics.

The method of illustrating the sound symbols of my chart to a class of pupils by means of the hand movements indicated may be divided into a series of progressions as follows:—

1. Cross the thumb as indicated and articulate "a" as in "cat," then turn the clenched left hand, nails upward, thumb extended to point to 10 on an imaginary clock dial, and pronounce "a" as in "all." Turning the same hand till the thumb reaches the vertical position "o" as in "old" is sounded, continuing the movement till the thumb points to two o'clock vocalize "e" as in "pet"; and as the progressive movement brings the thumb to the horizontal (three on the clock) "s" as in "his" is sounded. Then continuing till the thumb reaches the downward position place the curved first finger on the right hand to the point of the thumb on the left and sound "c" (soft) as in "face."

2. Place the right hand upon the left, palms together, fingers pointing to the right and open the hands. This position symbolizes the sound "a" in "male." Bring the tips of the fingers together, and open the "heels" of the hands and sound "oi" as in "oil." When the open hands as for "a," point to the sky they symbolize "i" as in "bite." Then closing the tips of the fingers, and opening the "heels" once again, vocalize "ow" as in "cow." Placing the right hand over the left slightly separated, both horizontal, palms inward, "e" as in "me" is sounded. Close the left hand palm inward, open the first two fingers separated horizontally and touch the point of the second with the first finger on the right hand, and this sign speaks "a" as in "care" or "ai" in "air." Without removing the fingers raise the hand to a vertical position and vocalize "f" (v) as in "of," or "ph" as in "Stephen."

3. Raise both hands clenched to a vertical position, backs inward, and vocalize "a" as in "cask." Turn both downward and sound "oo" as in "boot." Raise the left hand to the vertical again and vocalize "i" as in "it" or "y" as in "hymn;" then turn it downward and sound "u" as in "put" or "oo" as in "foot," etc.

4. Curve the thumb and fingers on the left hand to form part of an imperfect circle, fingers pointing away from the face, and the sign symbolizes "w" or "u" as in "we" "quill." Without altering the position of the left hand place the first two fingers on the right hand across the curved thumb and first finger on the left, and sound the power of "wh" as in "when." Remove these two fingers and close the points of the thumb and first finger on the left, and sound "o" or "a" as in "not" or "was." Without altering the position of the left hand place it toward the left eye (so that the eye appears as a "dot" in the circle formed by the thumb and finger on the left hand, and the sign for "g" (soft) as in "cage" is represented.

5. With the right hand form a curve with the thumb and fingers, hand erect, palm pointing to the left and the position gives the sign for "u" as in "bun" or "o" in "ton." Without altering the position place the first finger on the left along the thumb on the right and vocalize "a" as in "ago," "idea," or "er" in "upper," "r" in "year." Then turn the hand to the horizontal position (forward) and sound "u" as in "use." Continue the forward and downward movement till the thumb and fingers point downward and the sign is for "g" (hard) as in "get" or "x" as in "exist."

6. A sixth progression begins with the left hand concaved with palm upward. The sign is for "y" as in "yet." Reverse it by turning the palm downward and the sign signifies silent letters as the initial and penultimate letters in "psalm" or the "g" in "gnome." Then extend the hand so as to concave the back, forming a curve from the wrist to the tips of the fingers. This sign is for the sound of "er" in "her" or "or" in "word," and similar combinations. Raise the same hand to an almost vertical position, bend the tips of the fingers a little forward, palm toward the right, so that a curve is made from the tips to the wrist, and this symbolizes "f" as in "phone" or "gh" as in "rough." These two combinations take the power of "f." Next bend the same hand backward to an almost horizontal position, and the sign for the power of "ng" as in "sing" is obtained. It is also seen in "n" as in "bank."

7. Close all fingers on the left hand except the first which should point to the sky, and this is "l" as in "lift." Move it forward to a slightly oblique position pointing to about "one" on the clock, as shown in the fifth character, first row and it symbolizes the sound of "ch" as in "chill." Bring the same finger to the horizontal position, and place the tip of the first finger on the right hand curved outward at the end of that finger, and so get the sign for "th" as in "thin." Now place the first and second fingers of the right hand in a similar position, and the voiced "th" as in "they" is symbolized. Without changing the position of the first finger on the left, place the first finger on the right hand curved inward at the base of that finger, and so get the sign for the sound of "sh" as in "shall," and all other combinations of similar sound. Then bring up the second finger on the right hand into a similar position, and so symbolize the voiced "sh" (zh) as heard in "azure," "occasion," etc.

When final "d" takes the power of "t" as in "skipped," "banked," etc., it is symbolized on the hands by the sign for "t" thus:— close all fingers on the left hand except the first which should point vertically upward. Then close all fingers on the right hand except the first. Place this finger horizontally on top of the left and sound the power of "t."

What I claim and desire to secure by Letters Patent is:—

1. An article of manufacture as herein described, consisting of a chart which comprises a series of diagrams capable of individual representation manually by the palms and fingers of a person, and associated respectively with each of said diagrams, words or parts of words, each of said diagrams representing a sign visually indicating the vocalization or sound value of a letter or combination of letters contained in the word or part of a word with which it is associated.

2. An article of manufacture as herein described consisting of a chart which comprises a series of diagrams capable of individual manual representation, and associated respectively with said diagrams, words or parts of words each containing a letter or combination of letters the correct vocalization or sound value of which is graphically indicated by the diagram associated with it, and a diacritic symbol indicating the particular letter or combination of letters of which the sound is graphically indicated by the diagram.

3. An article of manufacture as herein described, consisting of a chart having arranged thereon a plurality of rectangular figures disposed in a series of parallel rows each of said figures containing a diagram representing a particular disposition of the hand or hands of a person, a combination of letters constituting a word or part of a word juxtaposed to each of said figures, and a symbol indicating the particular letter or combination of letters the correct vocalization or sound value of which is graphically indicated by the diagram associated with it.

Signed at Armidale aforesaid this fifth day of March, 1920.

GEORGE EDWARD JONES.

Witness:
JOHN A. McDONALD.